United States Patent
Schumacher

(10) Patent No.: US 9,080,897 B2
(45) Date of Patent: Jul. 14, 2015

(54) SELF-POWERED OPTICAL DETECTOR FOR MECHANICAL GAUGE INSTRUMENTS

(71) Applicant: Rosemount Inc., Chanhassen, MN (US)

(72) Inventor: Mark Stephen Schumacher, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 322 days.

(21) Appl. No.: 13/773,773

(22) Filed: Feb. 22, 2013

(65) Prior Publication Data

US 2014/0239151 A1    Aug. 28, 2014

(51) Int. Cl.
*G01D 5/26* (2006.01)

(52) U.S. Cl.
CPC .......................... *G01D 5/26* (2013.01)

(58) Field of Classification Search
CPC .... G01D 5/34746; G01D 5/3473; G01D 5/26
See application file for complete search history.

(56) References Cited

U.S. PATENT DOCUMENTS

| | | | |
|---|---|---|---|
| 3,219,824 A * | 11/1965 | Hand, Jr. et al. | ............ 250/347 |
| 7,222,049 B2 | 5/2007 | Schumacher | |
| 8,165,339 B2 | 4/2012 | Sim et al. | |
| 2001/0039914 A1 | 11/2001 | Chester | |
| 2008/0148877 A1 | 6/2008 | Sim | |
| 2009/0199645 A1 | 8/2009 | Hammerand et al. | |
| 2011/0290172 A1 | 12/2011 | Yamauchi | |
| 2012/0247385 A1 | 10/2012 | Cook | |

FOREIGN PATENT DOCUMENTS

JP     2009058357 A     3/2009

OTHER PUBLICATIONS

International Searching Authority Patent Cooperation Treaty, International Search Report and Written Opinion, Jun. 16, 2014, 11 pages.

* cited by examiner

*Primary Examiner* — Tony Ko
(74) *Attorney, Agent, or Firm* — Kinney & Lange, P.A.

(57) ABSTRACT

An embodiment of the present invention includes a display device including a mechanical indicator, a reference photodetector, a measurement photodetector, and an opaque shroud. The opaque shroud is connected to the mechanical indicator to variably cover the measurement photodetector based on a position of the mechanical indicator. The opaque shroud does not cover the reference photodetector.

20 Claims, 4 Drawing Sheets

US 9,080,897 B2

SELF-POWERED OPTICAL DETECTOR FOR MECHANICAL GAUGE INSTRUMENTS

BACKGROUND

The present invention relates generally to mechanical gauge instruments, and in particular to a display device and wireless communication circuit for a mechanical gauge instrument.

Mechanical gauge instruments, such as dial pressure gauges and temperature gauges, are used throughout industry as a simple and reliable means to indicate a process parameter, such as pressure or temperature. Such devices are often used as a last resort mechanical back-up to the more accurate electronic process transmitters that provide process information to a control and monitoring system. A feature of such mechanical gauge instruments, in addition to their mechanical simplicity, is their inherently self-powered operation. For example, a Bourdon tube moves in direct response to a pressure change, thus providing the mechanical energy necessary to move a mechanical indicator, such as a dial indicator. Similarly, a bimetallic strip moves in direct response to a temperature change to move a mechanical indicator.

Typically, mechanical gauge instruments are monitored by way of a person walking through an industrial plant, reading each of the instruments, and writing down the readings. This method of recording the instrument readings has the potential to expose the person making the recordings to hazardous areas in the industrial plant. In addition, the activity of reading a mechanical gauge and manually recording the reading may lead to significant errors, in addition to those inherent in the mechanical gauge instruments themselves. This activity is also expensive and time consuming.

A better way of safely and accurately providing mechanical gauge instrument readings, while preserving the simple, reliable, and self-powered nature of mechanical gauge instruments is needed.

SUMMARY

An embodiment of the present invention includes a display device including a mechanical indicator, a reference photodetector, a measurement photodetector, and an opaque shroud. The opaque shroud is connected to the mechanical indicator to variably cover the measurement photodetector based on a position of the mechanical indicator. The opaque shroud does not cover the reference photodetector.

Another embodiment of the present invention includes a method for generating a wireless signal representative of a relative position of a mechanical indicator. The method includes exposing a reference photodetector to a light source; exposing a measurement photodetector to the light source; covering a portion of the measurement photodetector with an opaque shroud connected to the mechanical indicator such that the covered portion corresponds to a position of the mechanical indicator; measuring a power output of the reference photodetector produced by exposure to the light source; measuring a power output of the measurement photodetector produced by exposure of the partially shrouded measurement photodetector to the light source; calculating the position of the mechanical indicator relative to a zero-scale position and a full-scale position; and transmitting the calculated relative position of the mechanical indicator by wireless communication. Calculating the relative position of the mechanical indicator is based on the measured power output of the reference photodetector and the measured power output of the measurement photodetector.

DETAILED DESCRIPTION

The present invention is a display device for a mechanical gauge instrument that provides a self-powered electronic signal corresponding to the relative position of a mechanical indicator of the instrument. Preferably, the electronic signal is wirelessly transmitted. A mechanical gauge instrument equipped with a display device embodying the present invention has the simplicity and reliability of a mechanical gauge instrument, while providing a wireless electronic signal corresponding to the relative position of the mechanical indicator. Wirelessly transmitting the relative position of the mechanical indicator eliminates the need for a person to enter an industrial plant area to read and record the mechanical indicator position. In addition, the indicator position information is available by way of the wireless signal much more frequently than it would be if provided by a person making rounds through the plant area. Transmitting the electronic signal also eliminates errors associated with reading and manually recording the relative position of the gauge's mechanical indicator. Thus, display devices embodying the present invention safely and accurately provide mechanical gauge instrument readings while preserving the simple, reliable, and self-powered nature of mechanical gauge instruments.

Figure 1:
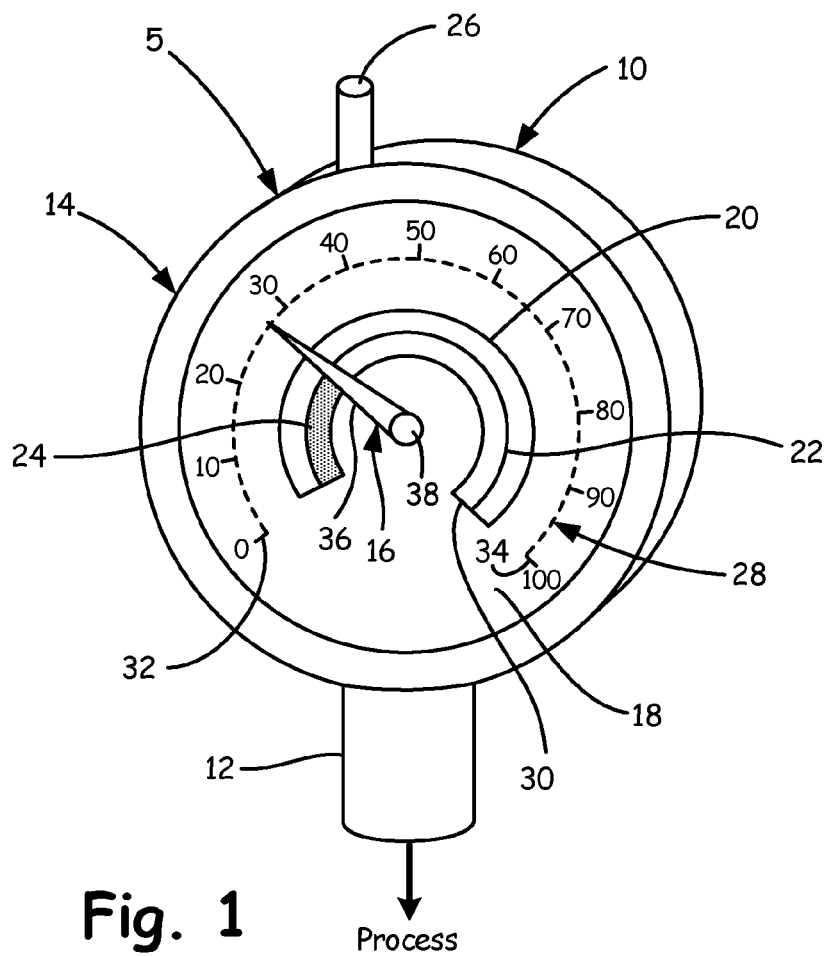
FIG. 1 is a perspective view of a mechanical gauge instrument embodying the present invention.

FIG. 1 is a perspective view of a mechanical gauge instrument embodying the present invention. As shown in FIG. 1, mechanical gauge instrument 5 includes housing 10, process connection 12, and display device 14. Display device 14 includes mechanical indicator 16, faceplate 18, reference photodetector 20, measurement photodetector 22, shroud 24, and antenna 26. Faceplate 18 includes scale 28 and opening 30. Scale 28 ranges from zero-scale position 32 to full-scale position 34. Measurement indicator 16 includes pointer 36 and shaft 38. Reference photodetector 20 and measurement photodetector 22 are photovoltaic cells that produce increasing power with increasing exposure to light. However, it is understood that the present invention encompasses embodiments employing any type of photodetector which exhibits a change in an electrical characteristic in response to a change in light striking the photodetector.

As shown in FIG. 1, process connection 12 connects housing 10 to a process or system to be monitored (not shown). Display device 14 is connected to housing 10 with antenna 26 extending from display device 14. Pointer 36 of mechanical indicator 16 extends radially outward from shaft 38, across reference photodetector 20 and measurement photodetector 22, to scale 28 of faceplate 18. Reference photodetector 20 and measurement photodetector 22 are positioned proximate to one another within opening 30 in faceplate 18 to permit ambient light to strike photodetectors 20, 22. Shroud 24 is connected to mechanical indicator 16 and extends over measurement photodetector 22 to an extent that varies with the movement of mechanical indicator 16 between zero-scale position 32 and full-scale position 34. Shroud 24 is opaque. As shroud 24 extends over a portion of measurement photodetector 22, it blocks ambient light from reaching that portion. Shroud 24 does not extend over or block ambient light from striking reference photodetector 20.

In the embodiment shown in FIG. 1, shroud 24 is shown as an arc-shaped structure connected to mechanical indicator 16 at pointer 36. However, it is understood that the present invention encompasses embodiments in which shroud 24 is other than an arc-shaped structure or shroud 24 is connected to mechanical indicator 16 at other than pointer 36. For example, shroud 24 may be a partial disk-shaped structure connected to mechanical indicator 16 at shaft 38.

Figure 2:
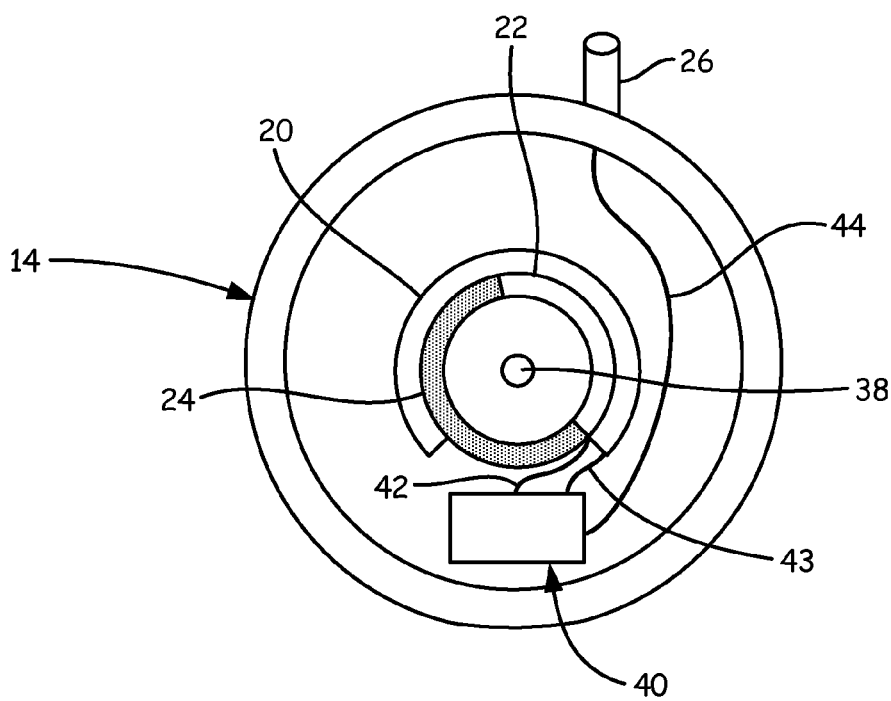
FIG. 2 is an interior view of the display device of FIG. 1.

FIG. 2 is an interior view of display device 14 showing a side of display device 14 opposite the side displaying scale 28. As shown in FIG. 2, display device 14 further includes electronics module 40, photodetector connections 42, 43, and antenna connection 44. Photodetector connection 42 electrically connects reference photodetector 20 to electronics module 40. Photodetector connection 43 electrically connects measurement photodetector 22 to electronics module 40. Antenna connection 44 connects antenna 26 to electronics module 40. As shown in FIGS. 1 and 2 together, a portion of shroud 24 not extending over a portion of measurement photodetector 22 extends behind faceplate 18.

Figure 3:
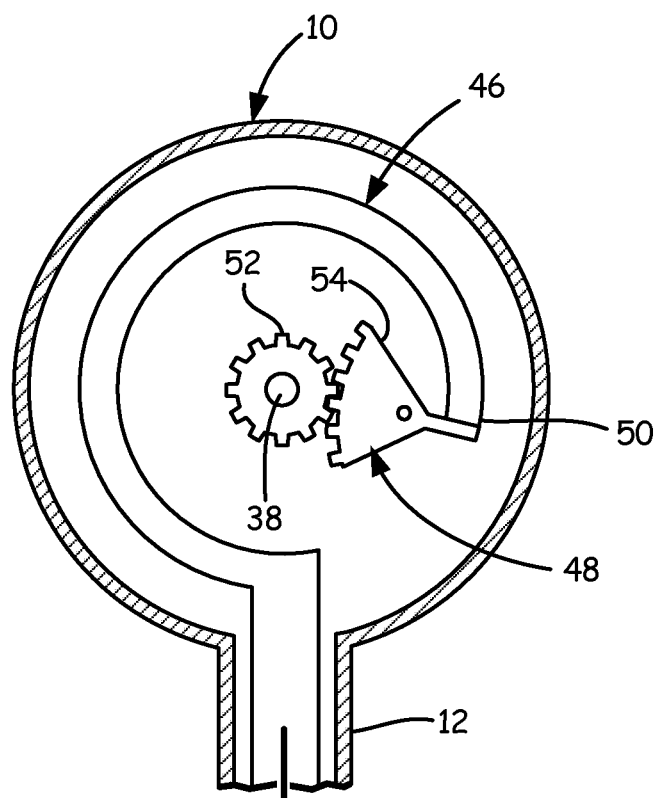
FIG. 3 is an interior view of the housing of the mechanical gauge instrument of FIG. 1.

FIG. 3 is an internal view of housing 10 of mechanical gauge instrument 5. As shown in FIG. 3, housing 10 includes mechanical sensing element 46 and link 48. Mechanical sensing element 46 includes movable portion 50. In this embodiment, mechanical sensing element 46 is a Bourdon tube in which movable portion 50 moves in response to changes in pressure from the process or system to be monitored. In other embodiments, a bimetallic apparatus, such as a bimetallic strip, may replace the Bourdon tube for monitoring changes in temperature. Link 48 includes pinion gear 50 and sector gear 52. Mechanical sensing element 46 extends from process connection 12 to movable portion 50, where it connects to link 48 at sector gear 52. Sector gear 52 meshes with pinion gear 50 which is connected to shaft 38. Link 48 connects to mechanical indicator 16 at shaft 38 such that mechanical indicator 16 and pinion gear 50 rotate together about an axis defined by shaft 38.

As shown in FIGS. 1, 2, and 3 together, movable portion 50 of mechanical sensing element 46 moves in response to a change in pressure at process connection 12, causing sector gear 52 to rotate pinion gear 50 and mechanical indicator 16. As mechanical indicator 16 rotates to a position, it visually indicates on scale 28 the sensed pressure relative to zero-scale position 32 and full-scale position 34. Simultaneously, mechanical indicator 16 moves attached shroud 24 over measurement photodetector 22, but not over reference photodetector 20. This causes the amount of ambient light striking measurement photodetector 22 to vary based on the position of mechanical indicator 16, while the amount of ambient light striking reference photodetector 20 does not change with the position of mechanical indicator 16. Although a portion of mechanical indicator 16 does cover reference photodetector 20 as it extends across to scale 28, this portion does not change throughout the range of scale 28. Electronics module 40 measures electrical changes in reference photodetector 20 and measurement photodetector 22 and then calculates the relative position of mechanical indicator 16 based upon these measurements. Electronics module 40 then wirelessly transmits the relative position of mechanical indicator 16 through antenna 26 by way of antenna connection 44. The wirelessly transmitted relative position of mechanical indicator 16 is received remotely by a control or monitoring system (not shown).

Reference photodetector 20 and measurement photodetector 22 are proximate one another so that changes in the intensity of the ambient light (or any ambient physical condition which may alter the behavior of photodetectors 20, 22, such as temperature) are experienced approximately equally by both reference photodetector 20 and measurement photodetector 22. However, because changes in the relative position of mechanical indicator 16 are detected only by measurement photodetector 22, electronics module 40 is able to filter out any change in ambient light (or other ambient physical condition) in calculating the relative position of mechanical indicator 16.

Wirelessly transmitting the relative position of mechanical indicator 16 eliminates the need for a person to enter an industrial plant area to read and record mechanical gauge instrument 5. By transmitting the information electronically, errors associated with reading and manually recording the relative position of mechanical indicator 16 are eliminated. Thus, display device 14 embodying the present invention safely and accurately provides mechanical gauge instrument readings while preserving the simple and reliable nature of mechanical gauge instrument 5.

Figure 4:
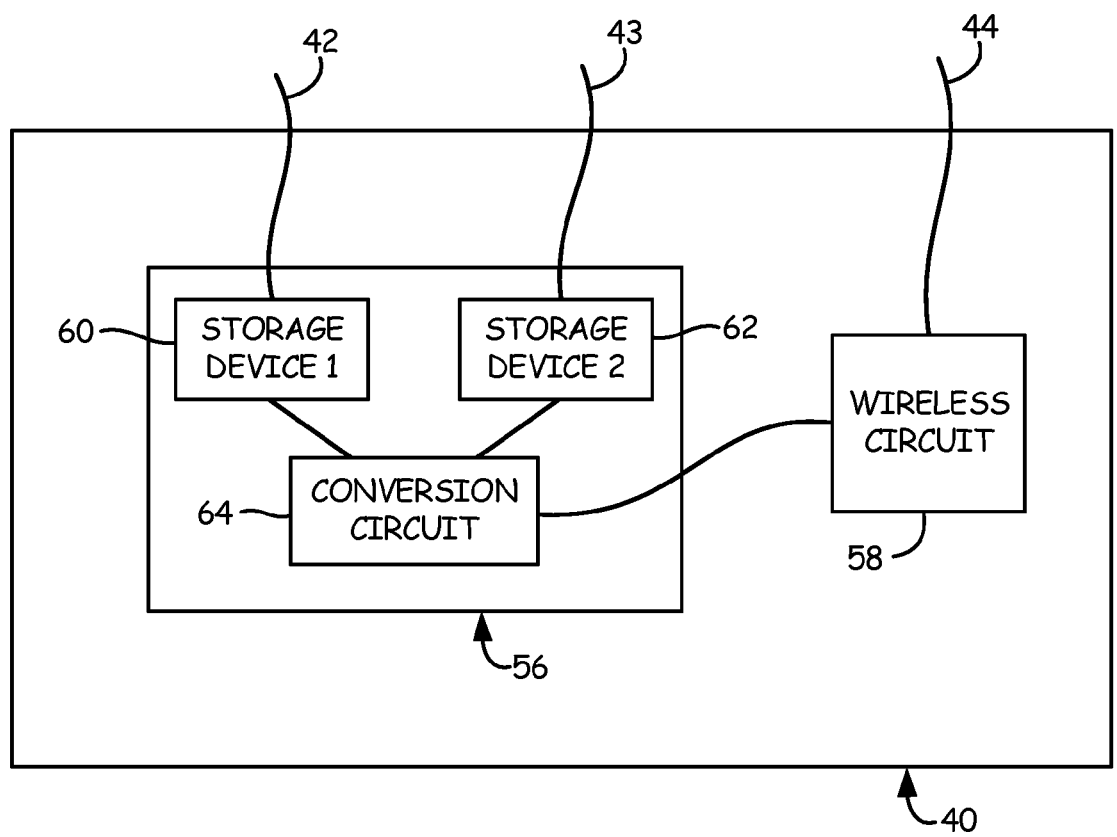
FIG. 4 is a block diagram illustrating the electronics module of the mechanical gauge instrument of FIG. 1.

FIG. 4 is a block diagram illustrating electronics module 40 of mechanical gauge instrument 5 of FIG. 1. FIG. 4 shows that electronics module 40 includes measurement circuit 56 connected to wireless communication circuit 58. Wireless communication circuit 58 is preferably a wireless transceiver or a wireless transponder for sending and receiving wireless transmissions. Alternatively, wireless communication circuit 58 may include only a wireless transmitter. Measurement circuit 56 includes first energy storage device 60, second energy storage device 62, and conversion circuit 64. Energy storage devices 60, 62 may be for example, capacitors or rechargeable batteries. Photodetector connection 42 electrically connects reference photodetector 20 to first energy storage device 60. Photodetector connection 43 electrically connects measurement photodetector 22 to second energy storage device 62. Antenna connection 44 connects antenna 26 to wireless communication circuit 58.

In this embodiment, reference photodetector 20 and measurement photodetector 22 are photovoltaic cells that produce increasing power with increasing exposure to light. Thus, first energy storage device 60 stores power produced by reference photodetector 20 and second energy storage device 62 stores power produced by measurement photodetector 22. Conversion circuit 64 measures power Pdr stored in first energy storage device 60 and power Pdm stored in second energy storage device 62 and calculates the relative position of mechanical indicator 16 based on power measurements Pdr, Pdm. The calculated relative position of mechanical indicator 16 is transmitted by wireless communication circuit 58 through antenna 26 by way of antenna connection 44. Because the calculated relative position of mechanical indicator 16 is derived from measurements of power Pdr stored in first energy storage device 60 and power Pdm stored in second energy storage device 62, the calculation effectively integrates the relative position over time, increasing the accuracy of the calculated relative position of mechanical indicator 16. However, it is to be noted that only the accuracy of the relative position of mechanical indicator 16 is improved. The inherent measurement accuracy of mechanical sensing element 46 is unchanged over that of a mechanical gauge instrument that does not embody the present invention.

The embodiment described in FIG. 4 accumulates power in each of first energy storage device 60 and second energy storage device 62. This power may also be used to power measurement circuit 56, wireless communication circuit 58, or both. In this way, display device 14 is able to provide wireless transmission of the relative position of mechanical indicator 16 in a self-powered fashion. Display device 14 may also include other energy storage devices (not shown), such as a non-rechargeable battery, to power measurement circuit 56, wireless communication circuit 58, or both. Thus, mechanical gauge instrument 5, including display device 14 embodying the present invention, safely and accurately provides mechanical gauge instrument readings, while preserving the simple, reliable, and self-powered nature of mechanical gauge instruments.

Conversion circuit 64 may calculate the relative position of mechanical indicator 16 by employing first power ratio R1. First power ratio R1 is given by:

$$R1 = \frac{Pdm}{Pdr}. \qquad \text{Eq. [1]}$$

The relative position of mechanical indicator 16 is then found by applying scaling transfer function K1 to first power ratio R1:

$$PV = K1\left[\frac{Pdm}{Pdr}\right], \qquad \text{Eq. [2]}$$

where PV is a calculated relative position of mechanical indicator 16.

Figure 5A:
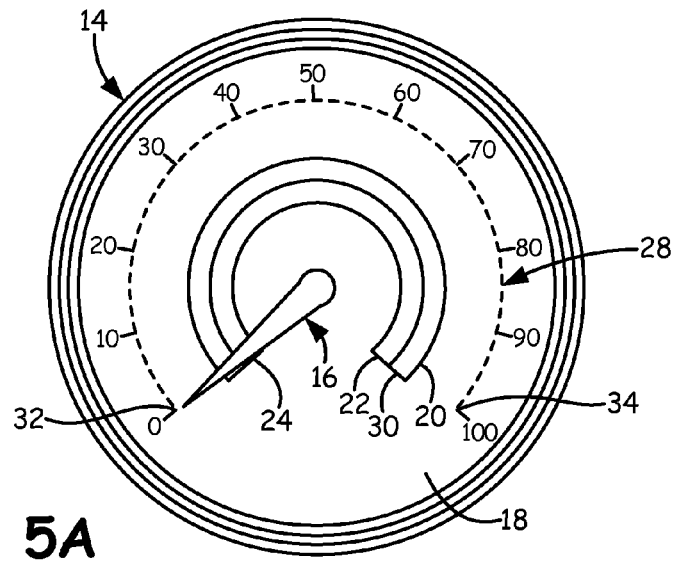
FIGS. 5A-5C illustrate the display device of the mechanical gauge instrument of FIG. 1 under various display conditions.
Figure 5B:
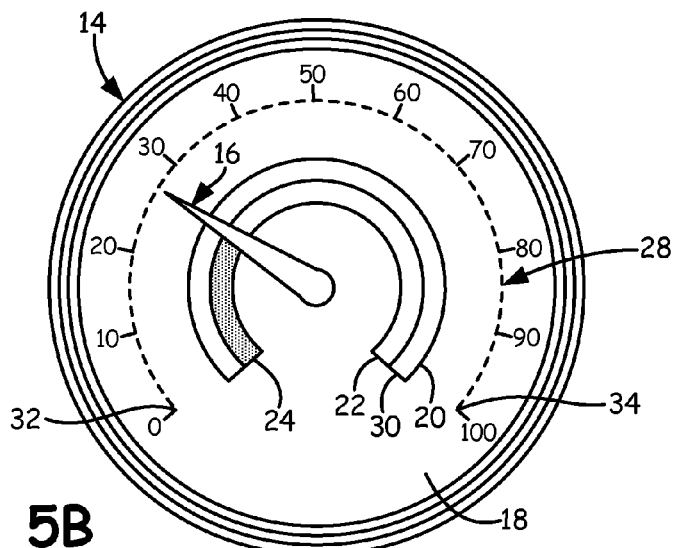
Figure 5C:
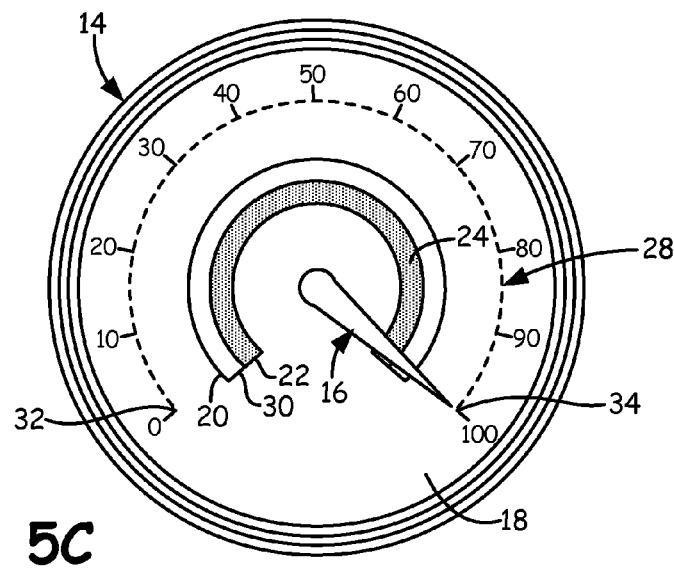

For example, consider FIGS. 5A-5C which illustrate display device 14 of mechanical gauge instrument 5 of FIG. 1 under various display conditions. FIG. 5A shows display device 14 having mechanical indicator 16 at zero-scale position 32 indicated as 0 on scale 28. At zero-scale position 32, shroud 24 does not cover any portion of measurement photodetector 22. As is known in the art, the power output of a photodetector is proportional to the surface area of the photodetector. Assuming reference photodetector 20 has twice surface area of measurement photodetector 22, this results in first power ratio R1 of 0.5:

$$R1 = \frac{Pdm}{Pdr} = \frac{Adm}{2 \times Adm} = 0.5, \qquad \text{Eq. [3]}$$

where Adm is the surface area of measurement photo detector 22.

FIG. 5C shows display device 14 having mechanical indicator 16 at full-scale position 34 indicated as 100 on scale 28. At full-scale position 34, shroud 24 covers all of measurement photodetector 22 and results in first power ratio R1 of zero:

$$R1 = \frac{Pdm}{Pdr} = \frac{0 \times Adm}{2 \times Adm} = 0. \qquad \text{Eq. [4]}$$

Applying an appropriate scaling transfer function K1 results in calculated relative position PV of 0 at zero-scale position 32 and calculated relative position PV of 100 at full-scale position 34.

FIG. 5B shows display device 14 having mechanical indicator 16 at a position intermediate between zero-scale position 32 and full-scale position 34 on scale 28. At this intermediate position, shroud 24 covers some, but not all, of measurement photodetector 22 and results in calculated relative position PV between 0 and 100.

Alternatively, conversion circuit 64 may calculate the relative position of mechanical indicator 16 employing second power ratio R2. Second power ratio R2 is given by:

$$R2 = \frac{Pdr + Pdm}{Pdr - Pdm}. \qquad \text{Eq. [5]}$$

The relative position of mechanical indicator 16 is then found by applying scaling transfer function K2 to second power ratio R2, as shown in equation:

$$PV = K2\left[\frac{Pd + Pdm}{Pdr - Pdm}\right], \qquad \text{Eq. [6]}$$

where PV is a calculated relative position of mechanical indicator 16.

For example, considering FIG. 5A-5C again, FIG. 5A shows display device 14 having mechanical indicator 16 at zero-scale position 32 indicated as 0 on scale 28. Assuming for this example that reference photodetector 20 has 50% more surface area than measurement photodetector 22, at zero-scale position 32 shroud 24 does not cover any portion of measurement photodetector 22 and results in second power ratio R2 of 5.0:

$$R2 = \frac{1.5 \times Adm + Adm}{1.5 \times Adm - Adm} = 5.0. \qquad \text{Eq. [7]}$$

FIG. 5C shows display device 14 having mechanical indicator 16 at full-scale position 34 indicated as 100 on scale 28. At full-scale position 34, shroud 24 covers all of measurement photodetector 22 and results in second power ratio R2 of 1.0.

$$R2 = \frac{1.5 \times Adm + 0 \times Adm}{1.5 \times Adm - 0 \times Adm} = 1.0. \qquad \text{Eq. [8]}$$

Applying an appropriate scaling transfer function K2 results in calculated relative position PV of 0 at zero-scale position 32 and calculated relative position PV of 100 at full-scale position 34.

FIG. 5B shows display device 14 having mechanical indicator 16 at position intermediate between zero-scale position 32 and full-scale position 34 on scale 28. At this intermediate position, shroud 24 covers some, but not all, of measurement photodetector 22 and results in calculated relative position PV between 0 and 100.

The embodiments described above transmit the relative position of mechanical indictor 16 wirelessly. Wireless connectivity provides many advantages over wired connectivity, including ease of installation and avoidance of the significant cost associated with providing cabling for wired connectivity to a process instrument. However, it is understood that the present invention encompasses embodiments in which electronics module 40 transmits the relative position of mechanical indicator 16 over a wired connection to a control or monitoring system (not shown).

In the embodiments described above, display device 14 is shown as a rotary dial display with mechanical indicator 16 moving in a rotary fashion. However, it is understood that the present invention encompasses other types of mechanical displays, for example a linear display. In addition, mechanical gauge instrument 5 is illustrated as a pressure gauge and mechanical sensing element 46 as a Bourdon tube. However, it is understood that the present invention encompasses other mechanical sensing elements, for example, a bimetallic strip for use in a mechanical gauge instrument that indicates temperature changes. Also, link 48 is illustrated as a sector gear/pinion gear arrangement, however it is understood that the present invention encompasses other links sufficient to translate the motion of movable portion 38 into the motion of mechanical indicator 16. Finally, although the light source is described as ambient, the invention encompasses embodiments where a light source is supplied specifically to illuminate faceplate 18, reference photodetector 20, and measurement photodetector 22.

A display device embodying the present invention provides an electronic signal corresponding to the relative position of a mechanical indicator of the instrument. The display device may also be wireless and self-powered. By wirelessly transmitting the relative position of the mechanical indicator, the need for a person to enter an industrial plant area to read and record the mechanical indicator position is eliminated. Transmitting an electronic signal also eliminates errors associated with reading and manually recording the relative position of the gauge's mechanical indicator. A mechanical gauge instrument equipped with a display device embodying the present invention safely and accurately provides mechanical gauge instrument readings while preserving the simple, reliable, and self-powered nature of the mechanical gauge instrument.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A display device comprising:
a mechanical indicator,
a reference photodetector;
a measurement photodetector; and
an opaque shroud connected to the mechanical indicator to variably cover the measurement photodetector based on a position of the mechanical indicator; the opaque shroud not covering the reference photodetector.

2. The display device of claim 1, further comprising:
a faceplate displaying a scale for indicating a position of the mechanical indicator relative to a zero-scale position and full-scale position; and
the opaque shroud covers the measurement photodetector to an extent corresponding to the relative position of the mechanical indicator.

3. The display device of claim 2, wherein the reference photodetector is proximate to the measurement photodetector; and both the reference photodetector and the measurement photodetector are positioned within an opening in the faceplate.

4. The display device of claim 2, further comprising a light source directed at least partially toward the faceplate, the reference photodetector, and the measurement photodetector.

5. The display device of claim 2, further comprising:
a measurement circuit electrically connected to the reference photodetector and to the measurement photodetector to calculate the relative position of the mechanical indicator based on an output of the reference photodetector and an output of the measurement photodetector; and
a wireless communication circuit connected to the measurement circuit to wirelessly communicate the calculated relative position of the mechanical indicator.

6. The display device of claim 5, wherein the reference photodetector and the measurement photodetector each include at least one photovoltaic cell.

7. The display device of claim 6, wherein the measurement circuit comprises:
a first electrical energy storage device electrically connected to the reference photodetector to store energy from the reference photodetector;
a second electrical energy storage device electrically connected to the measurement photodetector to store energy from the measurement photodetector; and
a conversion circuit electrically connected to the first electrical energy storage device and to the second electrical energy storage device to calculate the relative position of the mechanical indicator based on relative quantities of energy stored in each of the first and second electrical energy storage devices.

8. The display device of claim 7, wherein the energy stored in the first and second electrical energy storage devices at least partially powers at least one of the measurement circuit and the wireless communication circuit.

9. A mechanical gauge comprising:
a mechanical sensing element;
a display device linked to the mechanical sensing element, the display device comprising:
a mechanical indicator linked to a movable portion of the mechanical sensing device,
a reference photodetector;
a measurement photodetector; and
an opaque shroud connected to the mechanical indicator to variably cover the measurement photodetector based on a position of the mechanical indicator, and not cover the reference photodetector.

10. The gauge of claim 9, wherein the display device further comprises:
a faceplate displaying a scale for indicating a position of the mechanical indicator relative to zero-scale position and full-scale position; and
the opaque shroud covers the measurement photodetector to an extent corresponding to the relative position of the mechanical indicator.

11. The gauge of claim 10, wherein the mechanical sensing element is a mechanical pressure sensor and the zero-scale position corresponds to a relatively low pressure and the full-scale position corresponds to a higher pressure.

12. The gauge of claim 10, wherein the mechanical sensing element is a mechanical temperature sensor and the zero-scale position corresponds to a relatively low temperature and the full-scale position corresponds to a higher temperature.

13. The gauge of claim 10, wherein the display device further comprises:
- a measurement circuit electrically connected to the reference photodetector and to the measurement photodetector to calculate the relative position of the mechanical indicator based on an output of the reference photodetector and an output of the measurement photodetector; and
- a wireless communication circuit connected to the measurement circuit to wirelessly communicate the calculated relative position of the mechanical indicator.

14. The gauge of claim 13, wherein the reference photodetector and the measurement photodetector each include at least one photovoltaic cell.

15. The gauge of claim 14, wherein the measurement circuit comprises:
- a first electrical energy storage device electrically connected to the output of the reference photodetector;
- a second electrical energy storage device electrically connected to the output of the measurement photodetector; and
- a conversion circuit electrically connected to the first electrical energy storage device and to the second electrical energy storage device to calculate the relative position of the mechanical indicator based on relative quantities of energy stored in each of the first and second electrical energy storage devices.

16. The gauge of claim 15, wherein the energy stored in the first and second electrical energy storage devices at least partially powers the measurement circuit and the wireless communication circuit.

17. A method for generating a wireless signal representative of a relative position of a mechanical indicator, the method comprising:
- exposing a reference photodetector to a light source;
- exposing a measurement photodetector to the light source;
- covering a portion of the measurement photodetector with an opaque shroud connected to the mechanical indicator such that the covered portion corresponds to a position of the mechanical indicator;
- measuring a power output of the reference photodetector produced by exposure to the light source;
- measuring a power output of the measurement photodetector produced by exposure of an uncovered portion of the measurement photodetector to the light source;
- calculating the position of the mechanical indicator relative to a zero-scale position and a full-scale position based on the measured power output of the reference photodetector and the measured power output of the measurement photodetector; and
- transmitting the calculated relative position of the mechanical indicator by wireless communication.

18. A method of claim 17, wherein calculating the relative position of the mechanical indicator includes:
- calculating a first power ratio by dividing the measured power output of the measurement photodetector by the measured power output of the reference photodetector; and
- applying a scaling transfer function to the first power ratio to find the relative position of the mechanical indicator.

19. A method of claim 17, wherein calculating the relative position of the mechanical indicator includes:
- calculating a second power ratio by dividing a sum of the measured power output of the measurement photodetector and the measured power output of the reference photodetector by a difference between the measured power output of the measurement photodetector and the measured power output of the reference photodetector; and
- applying a scaling transfer function to the second power ratio find the relative position of the mechanical indicator.

20. A method of claim 17, wherein the transmitting of the calculated relative position by wireless communication is powered at least in part by at least one of the power output of the reference photodetector and the power output of the measurement photodetector.

* * * * *